US009232503B2

(12) United States Patent
He et al.

(10) Patent No.: US 9,232,503 B2
(45) Date of Patent: Jan. 5, 2016

(54) APPARATUS AND METHOD FOR CELL INFORMATION INDICATION IN A WIRELESS NETWORK

(71) Applicant: Intel Corporation, Santa Clara, CA (US)

(72) Inventors: Hong He, Beijing (CN); Youn Hyoung Heo, Seoul (KR); Kamran Etemad, Potomac, MD (US); Jong-Kae Fwu, Sunnyvale, CA (US); Seunghee Han, Kyoungkido (KR)

(73) Assignee: Intel Corporation, Santa Clara, CA (US)

( * ) Notice: Subject to any disclaimer, the term of this patent is extended or adjusted under 35 U.S.C. 154(b) by 368 days.

(21) Appl. No.: 13/728,740

(22) Filed: Dec. 27, 2012

(65) Prior Publication Data

US 2013/0288672 A1  Oct. 31, 2013

Related U.S. Application Data

(60) Provisional application No. 61/639,795, filed on Apr. 27, 2012, provisional application No. 61/707,784, filed on Sep. 28, 2012.

(51) Int. Cl.
*H04W 4/00* (2009.01)
*H04W 72/04* (2009.01)
(Continued)

(52) U.S. Cl.
CPC ...... *H04W 72/0406* (2013.01); *H04W 36/0083* (2013.01); *H04W 56/00* (2013.01)

(58) Field of Classification Search
USPC ......... 370/331, 225, 252, 315, 329, 280, 241, 370/254; 455/63.1, 522, 452.1, 434, 436, 455/507
See application file for complete search history.

(56) References Cited

U.S. PATENT DOCUMENTS

2010/0303039 A1* 12/2010 Zhang et al. .................. 370/331
2010/0330981 A1  12/2010 Kazmi
(Continued)

FOREIGN PATENT DOCUMENTS

| JP | 2011238988 A | 11/2011 |
| JP | 2012015992 A | 1/2012 |
| WO | 2011052643 A1 | 5/2011 |

OTHER PUBLICATIONS

LTE-Advanced: Next-Generation Wireless Broadband Technology Amitava Ghosh, Rapeepat Ratasuk, Bishwarup Mondal, Nitin Mangalvedhe, and Tim Thomas, Motorola Inc., Jun. 2010.*
(Continued)

*Primary Examiner* — Joseph Arevalo
(74) *Attorney, Agent, or Firm* — Grossman, Tucker, Perreault & Pfleger, PLLC

(57) ABSTRACT

Generally, this disclosure provides apparatus and methods for improved indication of cell information in a wireless network. The cell information may include an evolved Node B (eNB) carrier type. The UE device may include a receiver circuit configured to receive a Radio Resource Control (RRC) message from an evolved Node B (eNB) of a serving cell, the RRC message comprising carrier information associated with the serving cell eNB; a processing circuit configured to extract, from the serving cell eNB carrier information: a carrier type, synchronization information and Radio Resource Management (RRM) measurement information; a synchronization circuit configured to synchronize the UE to the serving cell eNB based on the synchronization information associated with the serving cell eNB carrier information; and a signal measurement circuit configured to perform RRM signal measurements on the serving cell eNB based on the RRM measurement information associated with the serving cell eNB carrier information.

20 Claims, 12 Drawing Sheets

(51) Int. Cl.
*H04W 56/00* (2009.01)
*H04W 36/00* (2009.01)

(56) References Cited

U.S. PATENT DOCUMENTS

| | | | | |
|---|---|---|---|---|
| 2011/0286327 | A1* | 11/2011 | Chen et al. | 370/225 |
| 2012/0057547 | A1* | 3/2012 | Lohr et al. | 370/329 |
| 2012/0076028 | A1* | 3/2012 | Ko et al. | 370/252 |
| 2012/0164948 | A1* | 6/2012 | Narasimha et al. | 455/63.1 |
| 2013/0010684 | A1* | 1/2013 | Park et al. | 370/315 |
| 2013/0010720 | A1* | 1/2013 | Lohr et al. | 370/329 |
| 2013/0028149 | A1* | 1/2013 | Chen et al. | 370/280 |
| 2013/0121299 | A1* | 5/2013 | Kim et al. | 370/329 |
| 2013/0155868 | A1* | 6/2013 | Seo et al. | 370/241 |
| 2013/0250910 | A1* | 9/2013 | Liao et al. | 370/331 |
| 2013/0272259 | A1* | 10/2013 | Kim et al. | 370/329 |
| 2013/0315157 | A1* | 11/2013 | Krishnamurthy et al. | 370/329 |
| 2013/0322361 | A1* | 12/2013 | Ko et al. | 370/329 |
| 2014/0056244 | A1* | 2/2014 | Frenne et al. | 370/329 |
| 2014/0241199 | A1* | 8/2014 | Chun et al. | 370/252 |

OTHER PUBLICATIONS

International Preliminary Report on Patentability and Written Opinion received for PCT Patent Application No. PCT/US2013/037981, mailed on Nov. 6, 2014, 6 pages.

International Search Report and Written Opinion received for PCT Patent Application No. PCT/US2013/037981, mailed on Jun. 28, 2013.

Huang, Chingyao, etal, "Radio Resource Management of Heterogeneous Services in Mobile WiMax Systems", IEEE Wireless Communications, Feb. 2007.

3 GPP, "Evolved Universal Terrestrial Radio Acsess (E-ULTRA)"; LTE, Radio Resource Control (RRC); Protocol specification, (3GPP TS 36.331 version 11.4.0 Release 11), ETSI TS 136 331, Technical Specification, (Jul. 2013), 350 pages.

3 GPP, "Evolved Universal Terrestrial Radio Acsess (E-ULTRA)"; LTE, Requirements for support of radio resource management (3GPP TS 36.133 version 11.5.0 Release 11), ETSI TS 136 133, Technical Specification, (Jul. 2013), 749 pages.

Office Action received for Japan Patent Application No. 2015-500684, mailed on Aug. 18, 2015, 3 pages of English translation and 3 pages of Japanese Office Action.

3GPP TSG RAN WG2#77bis, R2-121412, "Initial Overview on New Carrier," Samsung, Mar. 30, 2012, 3 pages.

3GPP TSG RAN WG2 Meeting #77, R2-120496, "New carrier type and power imbalance," Nokia Corporation, Nokia Siemens Networks, Feb. 6-10, 2012, 3 pages.

3GPP TSG-RAN2 Meeting #78, R2-122795, "DRX for new carrier type," Intel Corporation, May 21-25, 2012, 3 pages.

3GPP TSG-RAN WG2 #78, R2-122793, "Considerations on new carrier type support," Intel Corporation, May 20-25, 2012, 3 pages.

* cited by examiner

```
SystemInformationBlockType4 ::= SEQUENCE {
    intraFreqNeighCellList          IntraFreqNeighCellList OPTIONAL, -- Need OR
    intraFreqBlackCellList          IntraFreqBlackCellList OPTIONAL, -- Need OR
    csg-PhysCellIdRange             PhysCellIdRange OPTIONAL, -- Cond CSG
    ...,
    lateNonCriticalExtension        OCTET STRING OPTIONAL -- Need OP
}

IntraFreqNeighCellList ::= SEQUENCE (SIZE (1..maxCellIntra)) OF IntraFreqNeighCellInfo IntraFreqNeighCellInfo ::= SEQUENCE {
    physCellId          PhysCellId,
    q-OffsetCell        Q-OffsetRange,
    ...
}

*IntraFreqNeighCellInfo-newCarrierType* ::= SEQUENCE { OPTIONAL
    physCellId          PhysCellId,
    q-OffsetCell        Q-OffsetRange,
    *newCarrierType*    *NewCarrierType*
}

IntraFreqBlackCellList ::= SEQUENCE (SIZE (1..maxCellBlack)) OF PhysCellIdRange
```

```
SystemInformationBlockType5 ::= SEQUENCE {
    interFreqCarrierFreqList        interFreqCarrierFreqList,
    ...,
    lateNonCriticalExtension        OCTET STRING OPTIONAL -- Need OP
}

InterFreqCarrierFreqList ::= SEQUENCE (SIZE (1..maxFreq)) OF InterFreqCarrierFreqInfo InterFreqCarrierFreqInfo ::= SEQUENCE {
    dl-CarrierFreq                  ARFCN-ValueEUTRA,
    ...
    neighCellConfig                 NeighCellConfig,
    q-OffsetFreq                    Q-OffsetRange DEFAULT dB0,
    interFreqNeighCellList          InterFreqNeighCellList OPTIONAL, -- Need OR
    interFreqBlackCellList          InterFreqBlackCellList OPTIONAL, -- Need OR
    ...,
    [[ q-QualMin-r9                 Q-QualMin-r9 OPTIONAL, -- Need OP
       threshX-Q-r9 SEQUENCE {
           threshX-HighQ-r9         ReselectionThresholdQ-r9,
           threshX-LowQ-r9          ReselectionThresholdQ-r9
       } OPTIONAL -- Cond RSRQ
    ]]
}

InterFreqNeighCellList ::= SEQUENCE (SIZE (1..maxCellInter)) OF InterFreqNeighCellInfo InterFreqNeighCellInfo ::= SEQUENCE {
    physCellId                      PhysCellId,
    q-OffsetCell                    Q-OffsetRange
}

InterFreqNeighCellInfo-newCarrierType ::= SEQUENCE { OPTIONAL
    physCellId                      PhysCellId,
    q-OffsetCell                    Q-OffsetRange,
    newCarrierType                  NewCarrierType
}
```

APPARATUS AND METHOD FOR CELL INFORMATION INDICATION IN A WIRELESS NETWORK

CROSS-REFERENCE TO RELATED APPLICATIONS

The present patent application is related to and claims priority to U.S. Provisional Patent Applications: Ser. No. 61/639,795, filed Apr. 27, 2012, and Ser. No. 61/707,784, filed Sep. 28, 2012, the contents of which are incorporated herein by reference in their entirety.

FIELD

The present disclosure relates to wireless networks, and more particularly, to apparatus and methods for improved indication of cell information to User Equipment (UE) in a wireless network.

BACKGROUND

Wireless networks, for example Long Term Evolution (LTE) and LTE-Advanced (LTE-A) networks, may be heterogeneous networks that include "macro cells," providing higher power/wider area coverage, and "small cells," providing lower power/reduced area coverage. Small cells may include "femto cells," suitable for home or office coverage and "pico cells," for larger indoor environments such as shopping centers. A base station, for example an evolved Node B (eNB) transceiver, may be associated with each cell to provide network access to wireless mobile devices, for example User Equipment (UEs), passing through that cell coverage area.

As network traffic increases, new system enhancements are being implemented to improve bandwidth utilization and efficiency including the introduction of new carrier types with modified frame structures and synchronization methods. A heterogeneous network may include a mixture of eNBs, some operating with a New Carrier Type (NCT) and others operating with a legacy or Backward-compatible Carrier Type (BCT). The eNBs may further be operating at different carrier frequencies. A UE operating in this environment, including potential handovers between eNBs of different carrier types, needs to be able to determine the carrier type of eNBs in the network as well as the associated parameters related to measurement and management aspects of the UE operation.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 8 illustrates a data structure associated with another exemplary embodiment consistent with the present disclosure;

FIG. 9 illustrates a data structure associated with another exemplary embodiment consistent with the present disclosure;

Although the following Detailed Description will proceed with reference being made to illustrative embodiments, many alternatives, modifications, and variations thereof will be apparent to those skilled in the art.

DETAILED DESCRIPTION

Generally, this disclosure provides apparatus and methods for improved indication of cell information to a UE in a wireless network. The cell information may include information about the carrier type associated with a serving cell eNB of the UE and/or a neighbor cell eNB of the UE. The wireless network may be a heterogeneous LTE or LTE-A network that comprises eNBs operating with carriers that include both Backward-compatible Carrier Type (BCT) carriers and New Carrier Type (NCT) carriers. The eNBs may also operate at different carrier frequencies. The carrier type cell information may be transmitted as part of a Radio Resource Control (RRC) message and may include synchronization information and Radio Resource Management (RRM) measurement information. In some embodiments the carrier type cell information may be included in a neighbor cell list. In some embodiments the carrier type cell information may be included in a System Information Block (SIB) which may be a type 4 SIB (for intra-frequency configurations) and/or a type 5 SIB (for inter-frequency operations).

Figure 1:
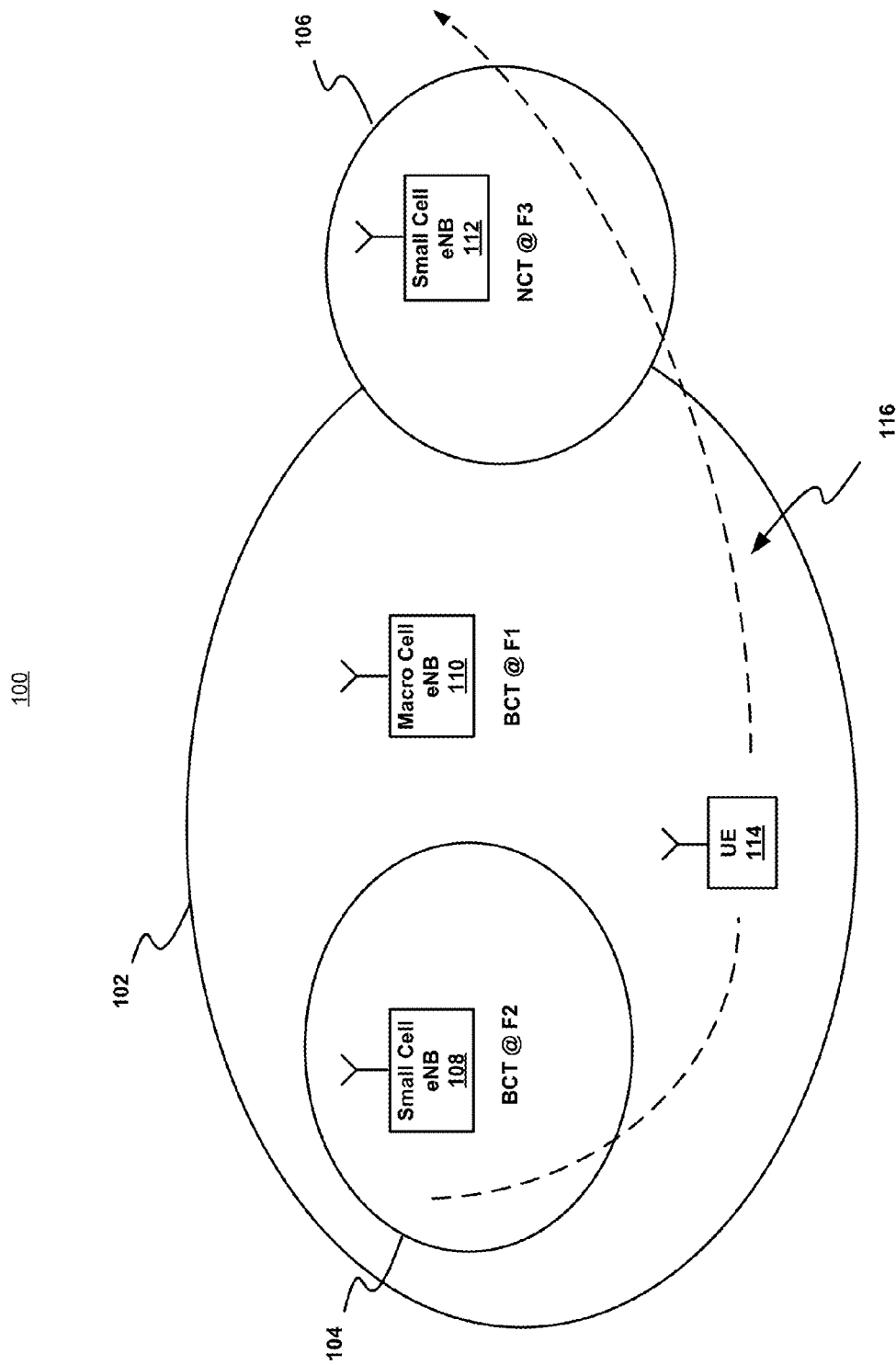
FIG. 1 illustrates a top level system diagram of one exemplary embodiment consistent with the present disclosure.

FIG. 1 illustrates a top level system diagram 100 of one exemplary embodiment consistent with the present disclosure. A heterogeneous wireless network 100 is shown to include a macro cell eNB 110, two small cell eNBs 108, 112 and a UE 114. The macro cell eNB 110 is configured as a BCT eNB operating at frequency F1, the small cell eNB 108 is configured as a BCT eNB operating at frequency F2 and the small cell eNB 112 is configured as an NCT eNB operating at frequency F3.

Small cells may include, for example, pico cells and femto cells. The macro cell eNB 110 provides cell coverage area 102, while small cell eNB 108 provides cell coverage area 104 and small cell eNB 112 provides cell coverage area 106. UE 114 is shown to travel on a path 116 through each of the cell coverage areas which may result in handovers between eNBs. As will be explained in greater detail below, UE 114 may be provided with information about the carrier type of the serving cell and/or neighbor cell eNBs as well as associated parameters related to measurement and management aspects of the UE operation.

While this is a simplified example, for illustration purposes, it will be appreciated that in practice any configuration of eNBs and UEs of various types may be deployed. The heterogeneous wireless network 100 may comply with, or otherwise be compatible with, the Third Generation Partnership Project (3GPP) Long Term Evolution (LTE) and/or LTE-Advanced (LTE-A) based wireless network standard, including current, previous and future versions of that standard.

Figure 2:
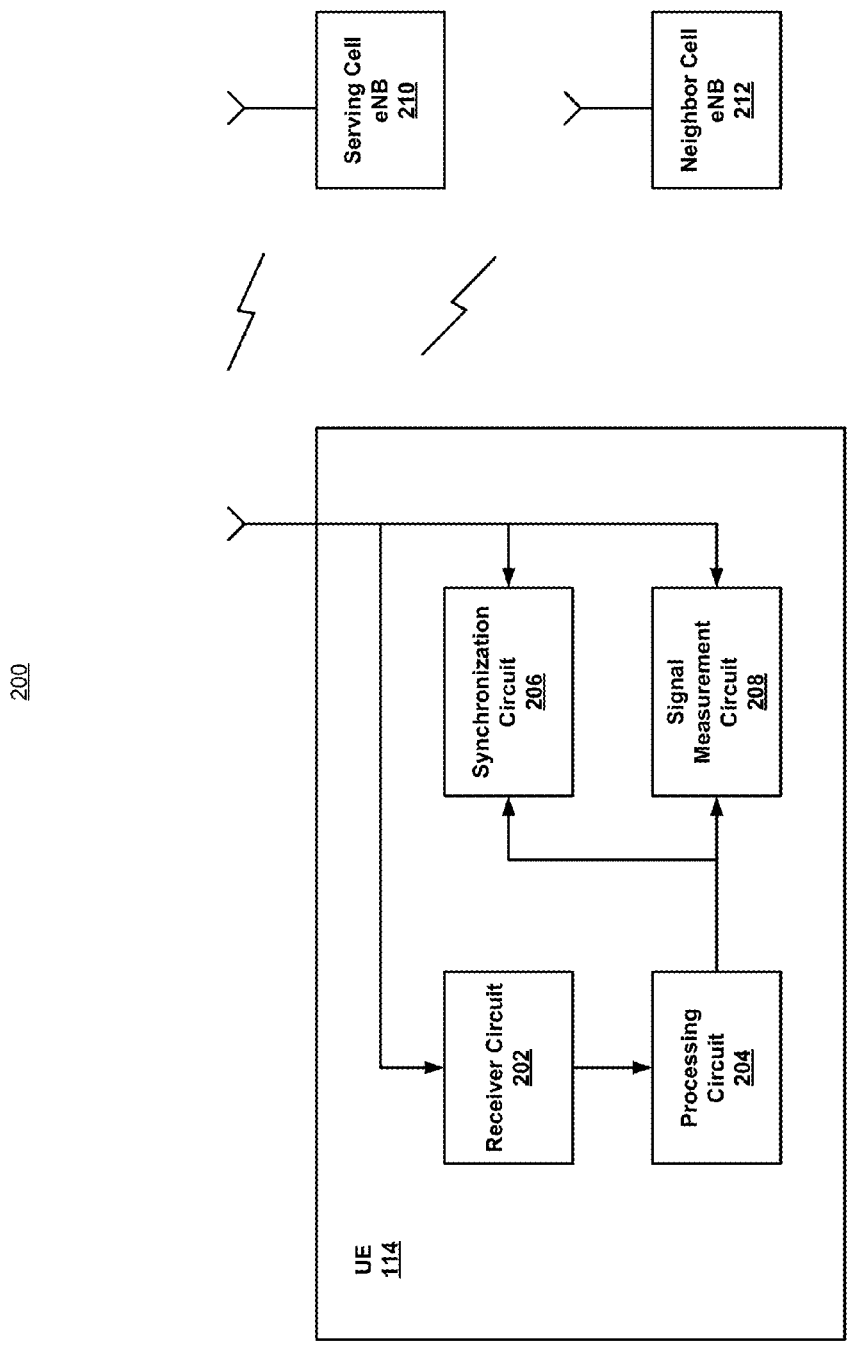
FIG. 2 illustrates a block diagram of one exemplary embodiment consistent with the present disclosure.

FIG. 2 illustrates a block diagram 200 of one exemplary embodiment consistent with the present disclosure. UE 114 is shown to be in communication with a serving cell eNB 210 and one or more neighbor cell eNBs 212. The eNBs 210 and 212 may correspond to macro cell eNB 110 or either of small cell eNBs 108 and 112. UE 114 is shown to comprise receiver circuit 202, processing circuit 204, synchronization circuit 206 and signal measurement circuit 208.

Receiver circuit 202 may be configured to receive a Radio Resource Control (RRC) message from serving cell eNB 210. The RRC message may include information related to the carrier of the serving cell eNB 210 as well as the carriers of one or more neighbor cell eNBs 212. The carrier information may include an indication of carrier type, synchronization information and Radio Resource Management (RRM) measurement information, any of which may be extracted by the processing circuit 204. Carrier types may include the following: BCT, non-synchronized NCT, synchronized NCT and standalone carrier.

Synchronization circuit 206 may be configured to synchronize the UE 114 to the serving cell eNB 210 and/or neighbor cell eNB 212 based on the synchronization information extracted from the carrier information. The synchronization information may comprise an indicator as to whether or not the Primary Synchronization Signal (PSS)/Secondary Synchronization Signal (SSS) is transmitted by the eNB. The synchronization information may further comprise a reference cell index to indicate which cell is used for the reference if the PSS/SSS is not transmitted.

Signal measurement circuit 208 may be configured to perform RRM signal measurements on the serving cell eNB 210 and/or neighbor cell eNB 212 based on the RRM measurement information extracted from the carrier information. The RRM measurement information may comprise an indicator as to whether the Channel State Information Reference Signal (CSI-RS) or the Cell Specific Reference Signal (CRS) is used for measurement. The RRM measurement information may also comprise a CRS sub-frame index to indicate where the CRS is transmitted within a cell.

In some embodiments, the carrier information may also provide the following additional information: a cell index to indicate where the enhanced Physical Downlink Control Channel (ePDCCH) is transmitted, resource allocation type designation and resource block assignment identifiers.

Figure 3:
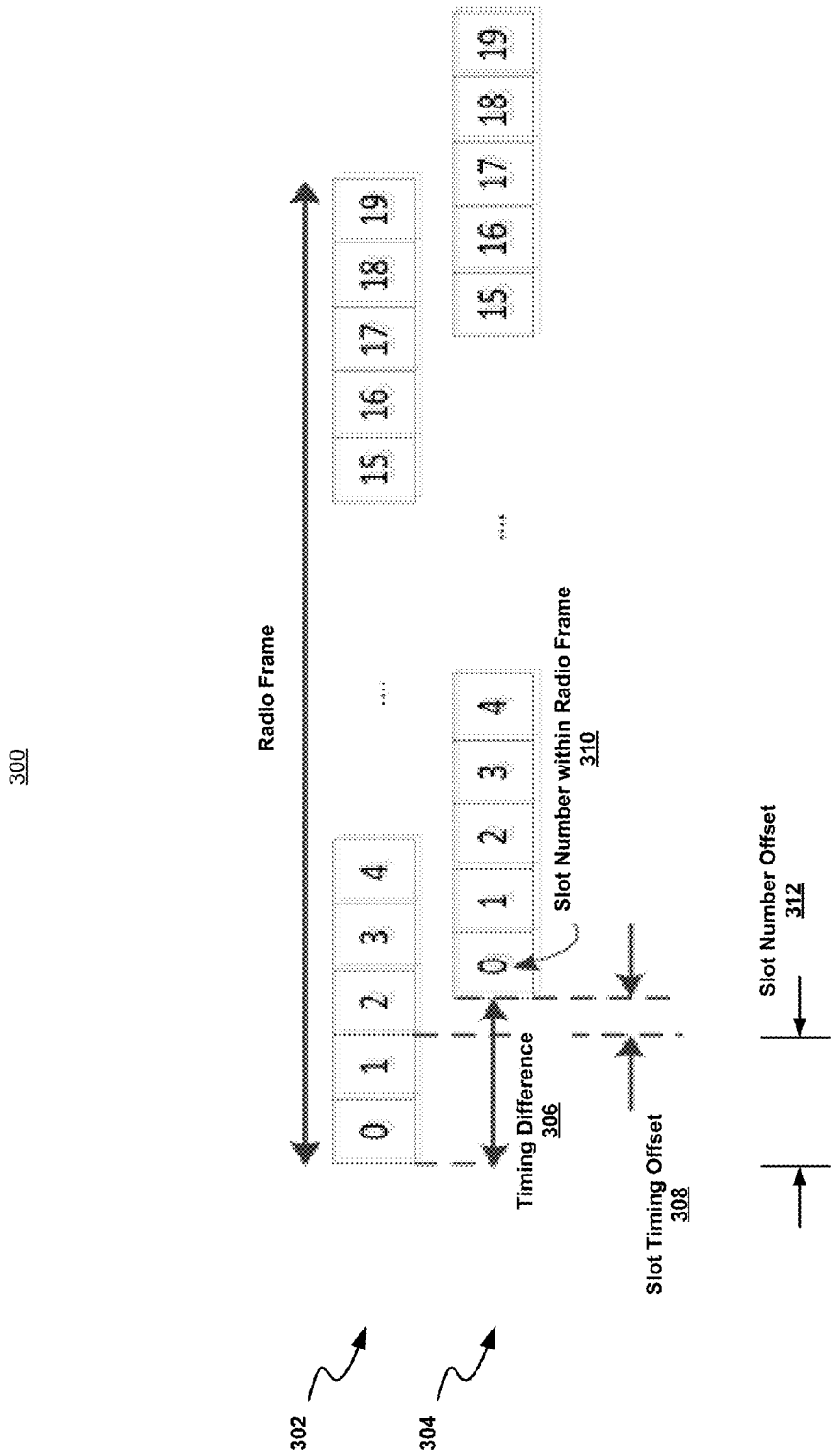
FIG. 3 illustrates a signal timing diagram of one exemplary embodiment consistent with the present disclosure.

In some embodiments, the carrier information may also provide a slot number offset 312 and slot timing offset 308 as illustrated in FIG. 3, which shows a radio frame 302 from the serving cell eNB and a radio frame 304 from a neighbor cell eNB. The radio frames 302, 304 each comprise designated slot numbers 310. The two radio frames 302 and 304 will generally not be time-aligned resulting in a timing difference 306 to exist between them. That timing difference may be represented by the slot number offset 312 and the slot timing offset 308 which is provided to the UE to aid the UE in finding the CRS sub-frame. The slot number offset 312 indicates the number of whole slots between the two radio frame boundaries, which in this example (FIG. 3) equals 2. The slot timing offset 308 indicates the time difference between the two closest slots of the serving cell and the neighbor cell to be measured. The slot timing offset 308 in combination with the slot number offset 312 provides an indication of the total timing difference 306 between the two radio frames.

FIGS. 4 through 9 illustrate data structures and/or message fields that may comply with, or otherwise be compatible with, the 3GPP LTE and/or LTE-A based wireless network standard, including current, previous and future versions of that standard.

Figure 4:
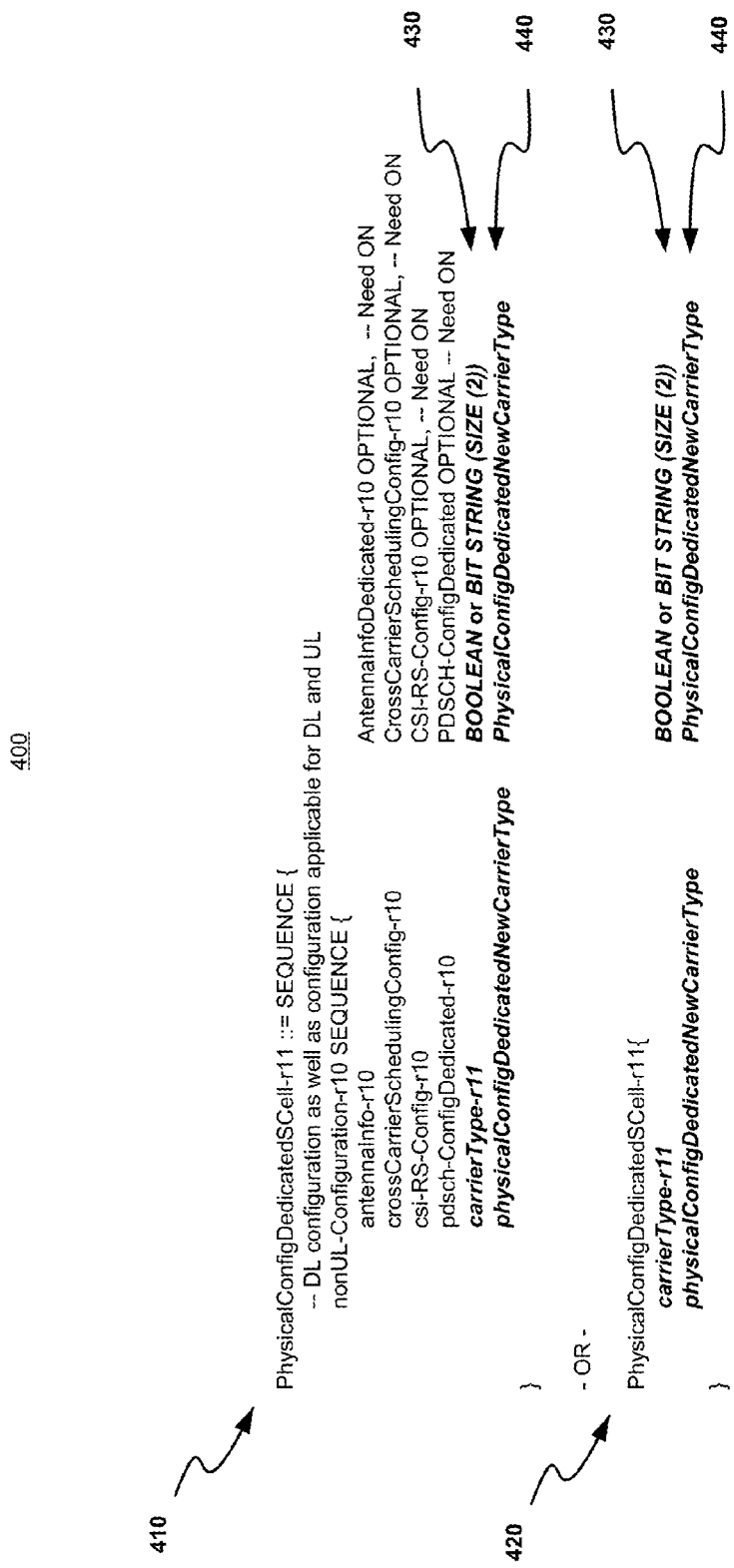
FIG. 4 illustrates a data structure associated with one exemplary embodiment consistent with the present disclosure.

FIG. 4 illustrates a data structure 400 associated with one exemplary embodiment consistent with the present disclosure. In an LTE or LTE-A system, a serving cell eNB, configured as an NCT, may send an RRC message to the UE that includes a new information field. The new information field may comprise either of the variations of a PhysicalConfigDedicatedSCell-r11 data item 410, 420 as shown in FIG. 4. The PhysicalConfigDedicatedSCell-r11 data item 410, 420 may further include carrierType-r11 430 and physicalConfigDedicatedNewCarrierType 440. These data items 430, 440 may be configured to provide the UE with information about the carrier type of the serving cell eNB for cell measurement and cell management purposes. The carrier type data item may indicate the following types of carriers: BCT, non-synchronized NCT, synchronized NCT and standalone carrier. In some embodiments, the carrier type data item may be configured as a BIT STRING type to allow for the indication of future versions and/or implementations of carrier types. In other embodiments, the carrier type data item may be configured as a BOOLEAN type, with a TRUE value used to indicate that the cell is an NCT and the UE may assume that only CRS port 0 is transmitted within 1 subframe with 5 ms periodicity. The physicalConfigDedicatedNewCarrierType 440 will be described in greater detail below.

Figure 5:
FIG. 5 illustrates a data structure associated with another exemplary embodiment consistent with the present disclosure.

FIG. 5 illustrates a data structure 500 associated with another exemplary embodiment consistent with the present disclosure. In an LTE or LTE-A system, a neighbor cell list provides information related to one or more neighboring cells and the eNBs associated of those neighboring cells. This information may include carrier frequencies, bandwidths and other information that may be required for UE measurements of the neighbor cells and possible handovers of the UE 114 from a serving cell to a neighboring cell. The neighbor cell list may be associated with an information element known as a MeasObjectEUTRA 510 which may be included as part of an RRC message (for example, an RRCConnectionReconfiguration message) from the serving cell eNB. In this embodiment, the MeasObjectEUTRA data item 510 may include new data items neighCellType 520 (similar to carrierType-r11 430 of FIG. 4) and physicalConfigDedicatedNewCarrierType 530. These data items may be configured to provide the UE with information about the carrier type of neighboring cell eNBs, particularly non-configured neighbor cell eNBs, for cell measurement and cell management purposes and will be described in greater detail below.

Figure 6:
FIG. 6 illustrates a data structure associated with another exemplary embodiment consistent with the present disclosure.

FIG. 6 illustrates a data structure 600 associated with another exemplary embodiment consistent with the present disclosure. Details of the physicalConfigDedicatedNewCarrierType data item 440 are shown to include the synchronization and measurement information previously discussed. The synchronization information includes data items synchTransmissionStatus and referenceCellIndex. The measurement information includes measureCSI-RS and crsSubFrame. Additionally, the ePDCCH-Config, resource allocation type, resource block assignment, slot number offset and slot timing offset are provided.

In some embodiments, the synchTransmissionStatus data item indicates whether or not a PSS/SSS is transmitted. If the PSS/SSS is not transmitted, the referenceCellIndex data item indicates which cell is used for the reference. The measureCSI-RS data item indicates whether CSI-RS is used for measurement instead of CRS and the crsSubFrame data item indicates where the CRS is transmitted in a specific cell. The slot number offset data item specifies the slot number offset at the transmitter between that specific cell and the serving cell. The slotNumberOffset together with the current slot number of the serving cell may be used to calculate the current slot number of that specific cell. The offset corresponds to the number of full slots counted from the beginning of a radio frame of the serving cell to the beginning of the closest subsequent radio frame of that specific cell. If this field is absent, the slot timing is the same as for the serving cell. The slot timing offset data item indicates the symbol offset at the transmitter between the specific cell and the serving cell. The slotTimingOffset together with the current slot boundary of the serving cell may be used to calculate the current slot boundary of the specific cell. This offset corresponds to the time offset from the beginning of a slot of the serving cell to the beginning of the closest subsequent slot of the specific cell.

Figure 7:
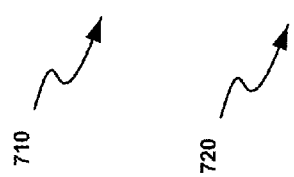
FIG. 7 illustrates a data structure associated with another exemplary embodiment consistent with the present disclosure.

FIG. 7 illustrates a data structure 700 associated with another exemplary embodiment consistent with the present disclosure. A CellsToAddMod data item 710 may be included in the MeasObjectEUTRA 510 data item for each neighbor cell that is specified in the MeasObjectEUTRA. In this embodiment, a new information field, NewCarrierType 720, maybe added to the CellsToAddMod data structure 710 to provide the carrier type, synchronization and measurement information previously discussed. In some embodiments, if the measureCSI-RS data item indicates that CSI-RS RRM measurements are configured in the MeasObjectEUTRA signaling as described above, the UE may rely on the fact that the size of the CSI-RS set for the RRM measurements is large enough to cover all neighboring cells on the associated carrier frequency.

FIG. 8 illustrates a data structure 800 associated with another exemplary embodiment consistent with the present disclosure. An example LTE or LTE-A System Information Block (SIB) 4 is shown at 810. If a UE 114 is in an RRC idle state, the neighboring cell list may be provided in SIB-4 810 with the addition of an intraFreqNeighCellInfo-newCarrierType data structure 820 that includes the newCarrierType field 720 to provide carrier information for the specified neighboring cell as previously described. This information may assist the UE to optimize cell search and re-selection.

FIG. 9 illustrates a data structure 900 associated with another exemplary embodiment consistent with the present disclosure. An example LTE or LTE-A System Information Block (SIB) 5 is shown at 910. If a UE 114 is in an RRC idle state, the neighboring cell list may be provided in SIB-5 910 with the addition of an interFreqNeighCellInfo-newCarrierType data structure 920 that includes a newCarrierType field 720 to provide carrier information for the specified neighboring cell as previously described. This information may assist the UE to optimize cell search and re-selection.

Figure 10:
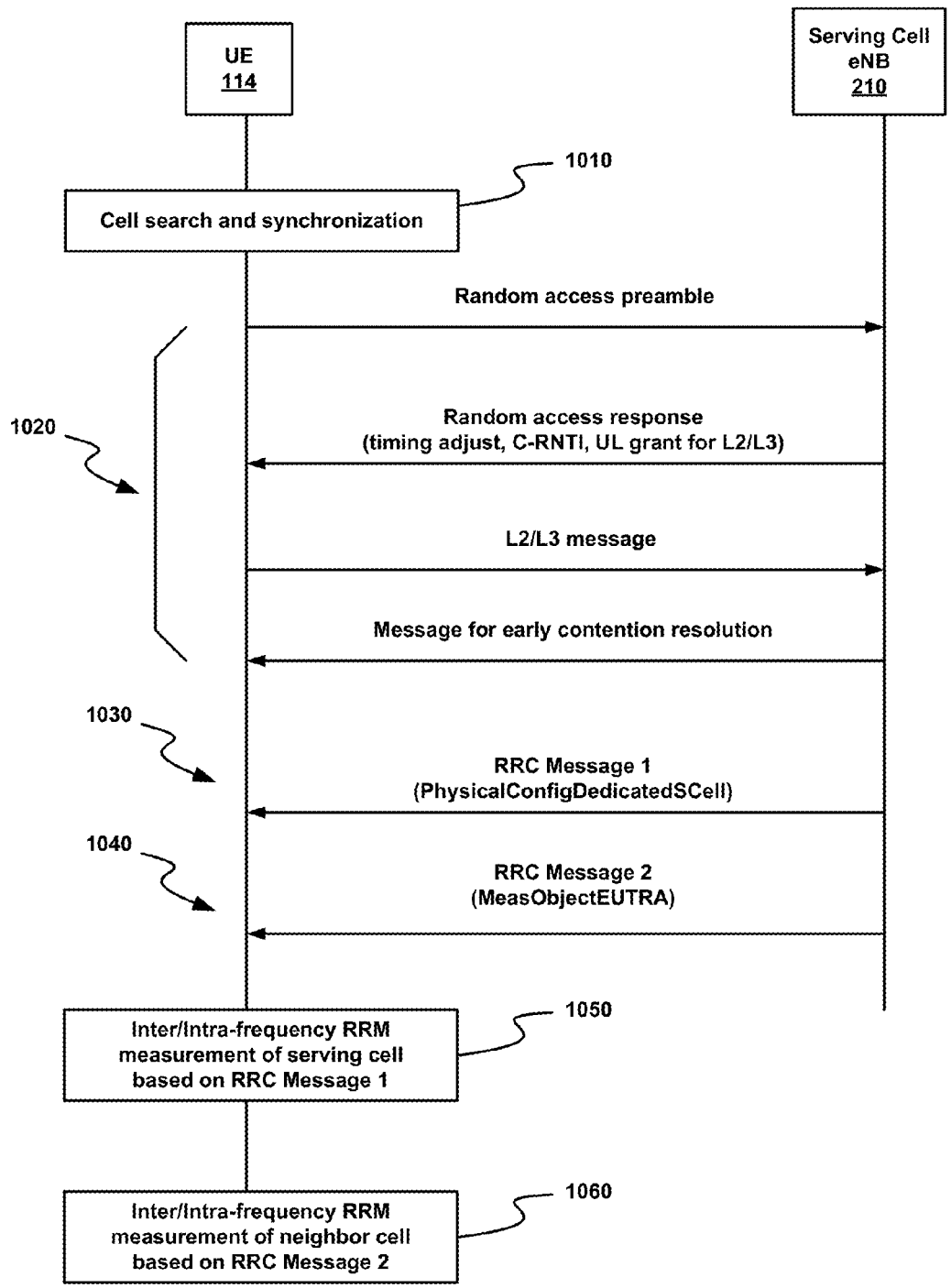
FIG. 10 illustrates a message flow diagram of an exemplary embodiment consistent with the present disclosure.

FIG. 10 illustrates a message flow diagram 1000 of an exemplary embodiment consistent with the present disclosure. The message flow diagram 1000 between UE 114 and serving cell eNB 210 provides an example of indication handling for the NCT. The UE performs a contention based random access procedure 1020 after a cell search and synchronization 1010. An RRC Message 1 1030 may be received from the serving cell eNB 210 by the UE 114. The message 1030 may include PhysicalConfigDedicatedSCell data item 410 to provide carrier type, synchronization information and RRM measurement related information associated with the serving cell eNB 210. An RRC Message 2 1040 may be received from the serving cell eNB 210 by the UE 114. The message 1040 may include MeasObjectEUTRA data item 510 to provide carrier type, synchronization information and RRM measurement related information associated with the neighbor cell eNBs. The UE 114 may then perform inter/intra-frequency RRM measurement of the serving cell eNB 210 based on RRC Message 1 1030 and inter/intra-frequency RRM measurement of neighbor cell eNBs based on RRC Message 2 1040.

Figure 11:
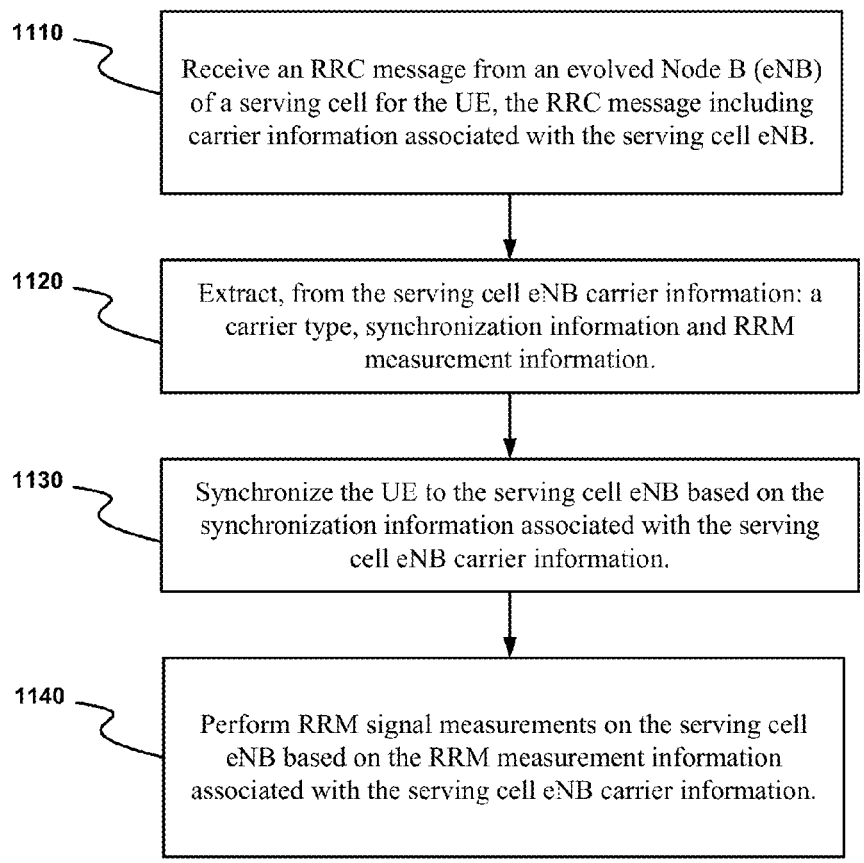
FIG. 11 illustrates a flowchart of operations of an exemplary embodiment consistent with the present disclosure.

FIG. 11 illustrates a flowchart of operations 1100 of an exemplary embodiment consistent with the present disclosure. At operation 1110, an RRC message is received from an evolved Node B (eNB) of a serving cell for the UE. The RRC message includes carrier information associated with the serving cell eNB. At operation 1120, a carrier type, synchronization information and RRM measurement information are extracted from the serving cell eNB carrier information. At operation 1130, the UE is synchronized to the serving cell eNB based on the synchronization information associated with the serving cell eNB carrier information. At operation 1140, RRM signal measurements are performed on the serving cell eNB based on the RRM measurement information associated with the serving cell eNB carrier information. The RRC message may also include carrier information associated with a neighbor cell eNB and the UE may synchronize and perform measurements on the neighbor cell based on this additional carrier information.

Figure 12:
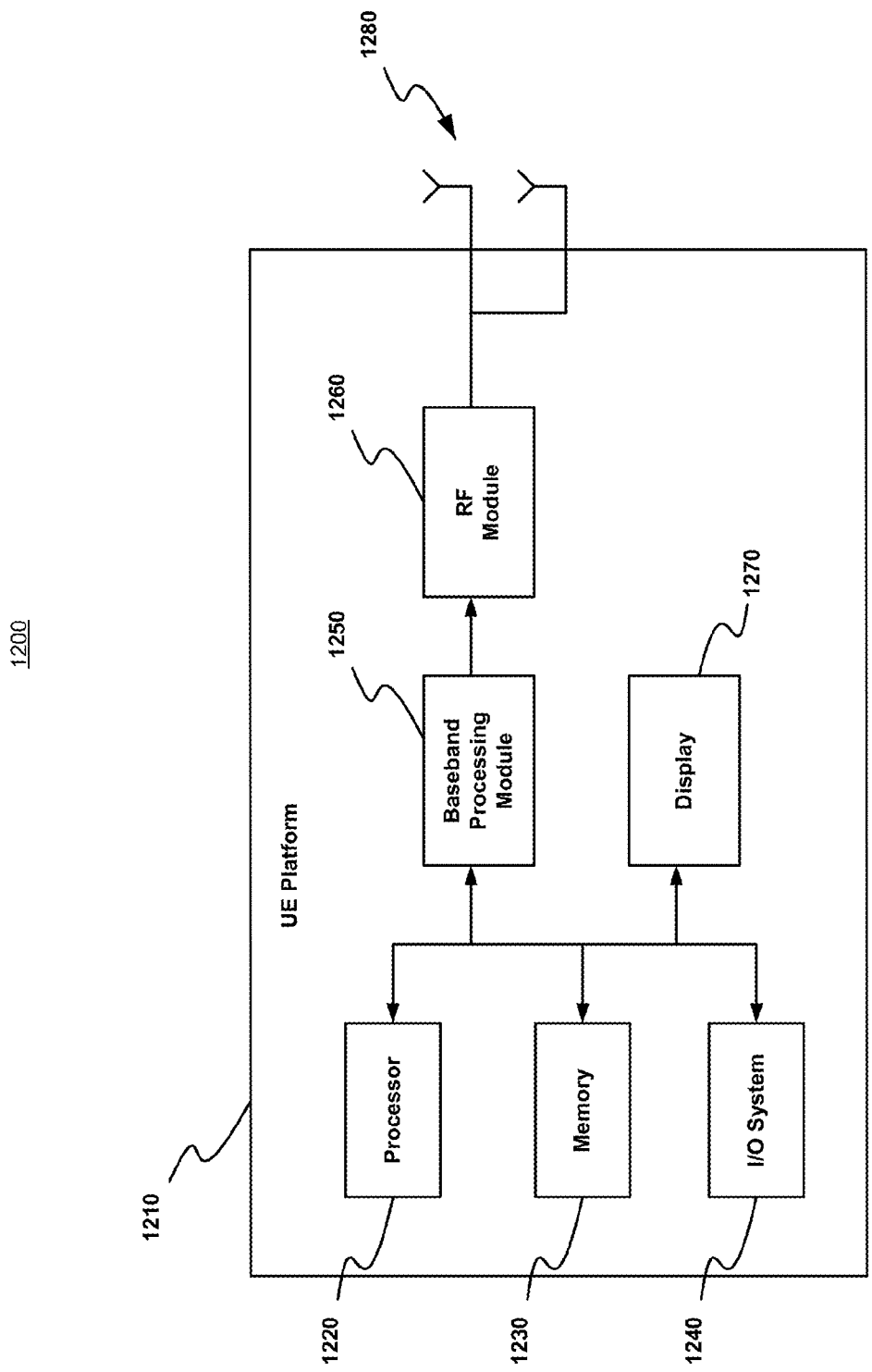
FIG. 12 illustrates a platform of one exemplary embodiment consistent with the present disclosure.

FIG. 12 illustrates a platform 1200 of one exemplary embodiment consistent with the present disclosure. The platform 1210 may be a mobile communication device, such as, for example, a UE device (smartphone), a tablet, a laptop computing device or any other device configured to transmit or receive wireless signals. In some embodiments, platform 1210 may comprise a processor 1220, memory 1230, an input/output (I/O) system 1240, a display/keyboard or other type of user interface (UI) 1270 such as, for example, a touchscreen. Platform 1210 may further comprise a baseband processing module 1250 and an RF processing module 1260 as well as one or more antennas 1280 which may form part of a Multiple Input Multiple Output (MIMO) antenna system. Any number of platforms 1200 may transmit or receive signals through RF module 1260 and antennas 1280 over a wireless network which may be an LTE or LTE-A wireless network.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides an apparatus, method and computer-readable storage medium for improved indication of cell information to a UE in a wireless network.

According to one aspect there is provided a UE. The UE may include a receiver circuit configured to receive an RRC message from an eNB of a serving cell for the UE, the RRC message including carrier information associated with the serving cell eNB. The UE of this example may also include a processing circuit configured to extract, from the serving cell eNB carrier information: a carrier type, synchronization information and RRM measurement information. The UE of this example may further include a synchronization circuit configured to synchronize the UE to the serving cell eNB based on the synchronization information associated with the serving cell eNB carrier information. The UE of this example may further include a signal measurement circuit configured to perform RRM signal measurements on the serving cell eNB based on the RRM measurement information associated with the serving cell eNB carrier information.

Another example UE includes the forgoing components and the RRC message from the serving cell eNB further includes carrier information associated with a neighbor cell eNB and the processing circuit is further configured to extract a carrier type, synchronization information and RRM measurement information from the neighbor cell eNB carrier information.

Another example UE includes the forgoing components and the synchronization circuit is further configured to synchronize the UE to the neighbor cell eNB based on the synchronization information associated with the neighbor cell eNB carrier information and the signal measurement circuit is further configured to perform RRM signal measurements on the neighbor cell eNB based on the RRM measurement information associated with the neighbor cell eNB carrier information.

Another example UE includes the forgoing components and the carrier type is a backward compatible carrier type, a non-synchronized new carrier type, a synchronized new carrier type and/or a stand-alone carrier type.

Another example UE includes the forgoing components and the synchronization information includes a status indicator for a PSS/SSS and a reference cell index associated with the PSS/SSS.

Another example UE includes the forgoing components and the RRM measurement information includes a CSI-RS usage indicator and a CRS usage indicator.

Another example UE includes the forgoing components and the RRM measurement information includes a sub-frame identifier for a CRS transmission and a sub-frame identifier for an ePDCCH.

Another example UE includes the forgoing components and the RRM measurement information includes a slot number offset between a radio frame of the serving cell eNB and a radio frame of the neighbor cell eNB and a slot timing offset between the radio frame of the serving cell eNB and the radio frame of the neighbor cell eNB.

According to another aspect there is provided a UE. The UE may include a receiver circuit configured to receive an RRC message from an eNB of a serving cell for the UE, the RRC message including a list of neighbor cells relative to the UE. The UE of this example may also include a processing circuit configured to extract, from the list of neighbor cells, carrier information associated with a neighbor cell eNB, the carrier information including: a carrier type, synchronization information and RRM measurement information. The UE of this example may further include a synchronization circuit configured to synchronize the UE to the neighbor cell eNB based on the synchronization information.

Another example UE includes the forgoing components and the carrier type is a backward compatible carrier type, a non-synchronized new carrier type, a synchronized new carrier type and/or a stand-alone carrier type.

Another example UE includes the forgoing components and further includes a signal measurement circuit configured to perform RRM signal measurements on the neighbor cell eNB based on the RRM measurement information, and the synchronization information includes a status indicator for a PSS/SSS and a reference cell index associated with the PSS/SSS.

Another example UE includes the forgoing components and the RRM measurement information includes a CSI-RS usage indicator and a Cell Specific Reference Signal CRS usage indicator.

Another example UE includes the forgoing components and the RRM measurement information includes a sub-frame identifier for a CRS transmission and a sub-frame identifier for an ePDCCH.

Another example UE includes the forgoing components and the RRM measurement information includes a slot number offset between a radio frame of the serving cell eNB and a radio frame of the neighbor cell eNB and a slot timing offset between the radio frame of the serving cell eNB and the radio frame of the neighbor cell eNB.

Another example UE includes the forgoing components and further includes memory coupled to the processing circuit, an I/O system coupled to the processing circuit, and a touchscreen display coupled to the I/O system.

According to another aspect there is provided a UE. The UE may include a receiver circuit configured to receive a message from an eNB of a serving cell for the UE, the message including an SIB, the SIB including a list of neighbor cells relative to the UE. The UE of this example may also include a processing circuit configured to extract, from the list of neighbor cells, carrier information associated with a neighbor cell eNB, the carrier information including: a carrier type, synchronization information and RRMmeasurement information. The UE of this example may further include a synchronization circuit configured to synchronize the UE to the neighbor cell eNB based on the synchronization information. The UE of this example may further include a signal measurement circuit configured to perform RRM signal measurements on the neighbor cell eNB based on the RRM measurement information.

Another example UE includes the forgoing components and the SIB is a System Information Block Type 4 and the neighbor cell eNB is an intra-frequency cell relative to the serving cell eNB.

Another example UE includes the forgoing components and the SIB is a System Information Block Type 5 and the neighbor cell eNB is an inter-frequency cell relative to the serving cell eNB.

Another example UE includes the forgoing components and the carrier type is a backward compatible carrier type, a non-synchronized new carrier type, a synchronized new carrier type and/or a stand-alone carrier type.

Another example UE includes the forgoing components and the synchronization information includes a status indicator for a PSS/SSS and a reference cell index associated with the PSS/SSS.

Another example UE includes the forgoing components and the RRM measurement information includes a CSI-RS usage indicator and a CRS usage indicator.

Another example UE includes the forgoing components and the RRM measurement information includes a sub-frame identifier for a CRS transmission and a sub-frame identifier for an ePDCCH.

Another example UE includes the forgoing components and the RRM measurement information includes a slot number offset between a radio frame of the serving cell eNB and a radio frame of the neighbor cell eNB and a slot timing offset between the radio frame of the serving cell eNB and the radio frame of the neighbor cell eNB.

According to another aspect there is provided a method. The method may include receiving an RRC message from an eNB of a serving cell for the UE, the RRC message including carrier information associated with the serving cell eNB. The method of this example may also include extracting a carrier type, synchronization information and RRM measurement information from the serving cell eNB carrier information. The method of this example may further include synchronizing the UE to the serving cell eNB based on the synchronization information associated with the serving cell eNB carrier information. The method of this example may further include performing RRM signal measurements on the serving cell eNB based on the RRM measurement information associated with the serving cell eNB carrier information. The method of this example may further include synchronizing with and performing measurements on a neighbor cell based on additional carrier information, the RRC message including additional carrier information associated with a neighbor cell eNB.

According to another aspect there is provided a computer-readable storage medium having instructions stored thereon which when executed by a processor result in the operations for improved indication of cell information to a UE in a wireless network previously described.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. User Equipment (UE) comprising:
   a receiver circuit configured to receive a Radio Resource Control (RRC) message from an evolved Node B (eNB) of a serving cell for said UE, said RRC message comprising carrier information associated with said serving cell eNB;
   a processing circuit configured to extract, from said serving cell eNB carrier information: a carrier type, synchronization information and Radio Resource Management (RRM) measurement information, wherein said synchronization information comprises a status indicator for a Primary Synchronization Signal (PSS) / Secondary Synchronization Signal (SSS) and a reference cell index associated with said PSS/SSS;
   a synchronization circuit configured to synchronize said UE to said serving cell eNB based on said synchronization information associated with said serving cell eNB carrier information; and
   a signal measurement circuit configured to perform RRM signal measurements on said serving cell eNB based on said RRM measurement information associated with said serving cell eNB carrier information.

2. The UE of claim 1, wherein said RRC message from said serving cell eNB further comprises carrier information associated with a neighbor cell eNB and said processing circuit is further configured to extract a carrier type, synchronization information and RRM measurement information from said neighbor cell eNB carrier information.

3. The UE of claim 2, wherein said RRM measurement information comprises a slot number offset between a radio frame of said serving cell eNB and a radio frame of said neighbor cell eNB and a slot timing offset between said radio frame of said serving cell eNB and said radio frame of said neighbor cell eNB.

4. The UE of claim 2, wherein said synchronization circuit is further configured to synchronize said UE to said neighbor cell eNB based on said synchronization information associated with said neighbor cell eNB carrier information and said signal measurement circuit is further configured to perform RRM signal measurements on said neighbor cell eNB based on said RRM measurement information associated with said neighbor cell eNB carrier information.

5. The UE of claim 1, wherein said carrier type is selected from the group consisting of a backward compatible carrier type, a non-synchronized new carrier type, a synchronized new carrier type and a stand-alone carrier type.

6. The UE of claim 1, wherein said RRM measurement information comprises a Channel State Information Reference Signal (CSI-RS) usage indicator and a Cell Specific Reference Signal (CRS) usage indicator.

7. The UE of claim 1, wherein said RRM measurement information comprises a sub-frame identifier for a CRS transmission and a sub-frame identifier for an enhanced Physical Downlink Control Channel (ePDCCH).

8. User Equipment (UE) comprising:
   a receiver circuit configured to receive a Radio Resource Control (RRC) message from an evolved Node B (eNB) of a serving cell for said UE, said RRC message comprising a list of neighbor cells relative to said UE;
   a processing circuit configured to extract, from said list of neighbor cells, carrier information associated with a neighbor cell eNB, said carrier information comprising: a carrier type, synchronization information and Radio Resource Management (RRM) measurement information, wherein said RRM measurement information comprises a slot number offset between a radio frame of said serving cell eNB and a radio frame of said neighbor cell eNB and a slot timing offset between said radio frame of said serving cell eNB and said radio frame of said neighbor cell eNB; and
   a synchronization circuit configured to synchronize said UE to said neighbor cell eNB based on said synchronization information.

9. The UE of claim 8, wherein said carrier type is selected from the group consisting of a backward compatible carrier type, a non-synchronized new carrier type, a synchronized new carrier type and a stand-alone carrier type.

10. The UE of claim 8, further comprising a signal measurement circuit configured to perform RRM signal measurements on said neighbor cell eNB based on said RRM measurement information, wherein said synchronization information comprises a status indicator for a Primary Synchronization Signal (PSS) / Secondary Synchronization Signal (SSS) and a reference cell index associated with said PSS/SSS.

11. The UE of claim 8, wherein said RRM measurement information comprises a Channel State Information Reference Signal (CSI-RS) usage indicator and a Cell Specific Reference Signal (CRS) usage indicator.

12. The UE of claim 8, wherein said RRM measurement information comprises a sub-frame identifier for a CRS transmission and a sub-frame identifier for an enhanced Physical Downlink Control Channel (ePDCCH).

13. The UE of claim 8, further comprising memory coupled to said processing circuit, an input/output (I/O) system coupled to said processing circuit, and a touchscreen display coupled to said I/O system.

14. User Equipment (UE) comprising:
 a receiver circuit configured to receive a message from an evolved Node B (eNB) of a serving cell for said UE, said message including a System Information Block (SIB), said SIB comprising a list of neighbor cells relative to said UE;
 a processing circuit configured to extract, from said list of neighbor cells, carrier information associated with a neighbor cell eNB, said carrier information comprising: a carrier type, synchronization information and Radio Resource Management (RRM) measurement information, wherein said synchronization information comprises a status indicator for a Primary Synchronization Signal (PSS) / Secondary Synchronization Signal (SSS) and a reference cell index associated with said PSS/SSS;
 a synchronization circuit configured to synchronize said UE to said neighbor cell eNB based on said synchronization information; and
 a signal measurement circuit configured to perform RRM signal measurements on said neighbor cell eNB based on said RRM measurement information.

15. The UE of claim 14, wherein said SIB is a System Information Block Type 4 and said neighbor cell eNB is an intra-frequency cell relative to said serving cell eNB.

16. The UE of claim 14, wherein said SIB is a System Information Block Type 5 and said neighbor cell eNB is an inter-frequency cell relative to said serving cell eNB.

17. The UE of claim 14, wherein said carrier type is selected from the group consisting of a backward compatible carrier type, a non-synchronized new carrier type, a synchronized new carrier type and a stand-alone carrier type.

18. The UE of claim 14, wherein said RRM measurement information comprises a Channel State Information Reference Signal (CSI-RS) usage indicator and a Cell Specific Reference Signal (CRS) usage indicator.

19. The UE of claim 14, wherein said RRM measurement information comprises a sub-frame identifier for a CRS transmission and a sub-frame identifier for an enhanced Physical Downlink Control Channel (ePDCCH).

20. The UE of claim 14, wherein said RRM measurement information comprises a slot number offset between a radio frame of said serving cell eNB and a radio frame of said neighbor cell eNB and a slot timing offset between said radio frame of said serving cell eNB and said radio frame of said neighbor cell eNB.

* * * * *